J. B. ZIMDARS.
INTERNAL TIRE ARMOR.
APPLICATION FILED MAY 13, 1918.

1,291,345.

Patented Jan. 14, 1919.

INVENTOR
J. B. ZIMDARS by F. M. Wright,

ATT'Y.

UNITED STATES PATENT OFFICE.

JOHN B. ZIMDARS, OF SAN FRANCISCO, CALIFORNIA.

INTERNAL TIRE-ARMOR.

1,291,345.

Specification of Letters Patent. Patented Jan. 14, 1919.

Original application filed September 7, 1917, Serial No. 190,108. Divided and this application filed May 13, 1918. Serial No. 234,349.

*To all whom it may concern:*

Be it known that I, JOHN B. ZIMDARS, a citizen of the United States, residing at San Francisco, in the county of San Francisco and State of California, have invented new and useful Improvements in Internal Tire-Armors, of which the following is a specification.

The present invention relates to improvements in internal tire armors, the present application being a division of an application for pneumatic tires filed by me September 7, 1917, Serial No. 190,108.

Figure 1:
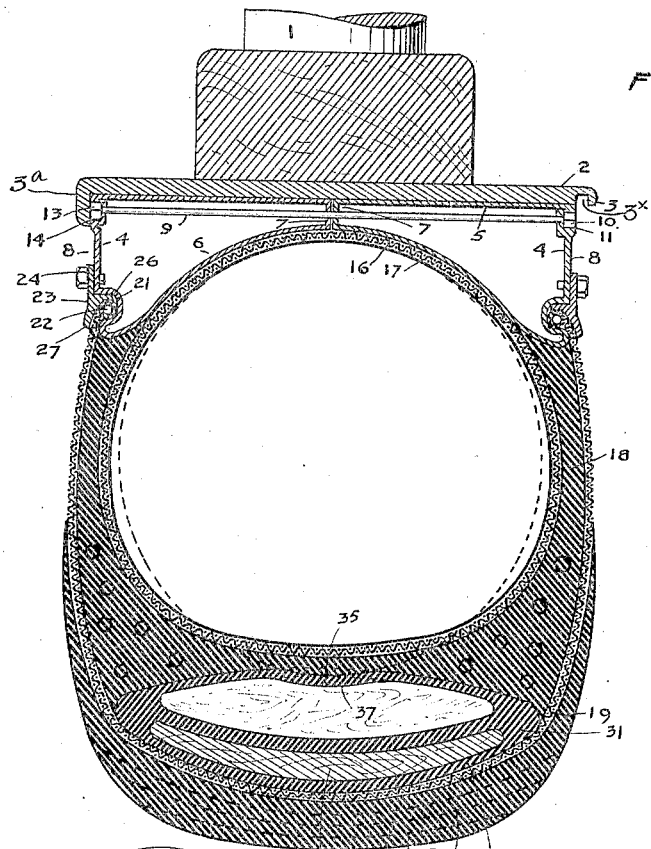
Figure 2:
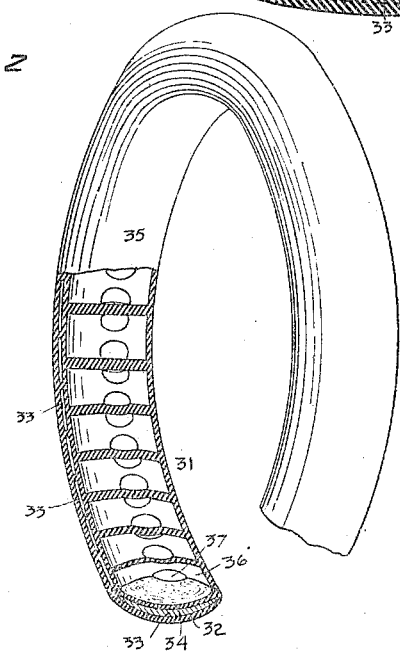
Figure 3:
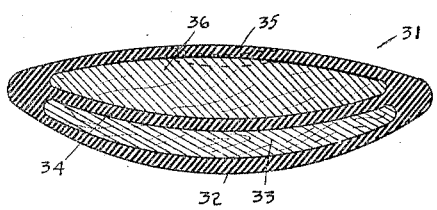

In the accompanying drawing, Figure 1 is a transverse sectional view of a pneumatic tire constructed in accordance with my invention showing a transverse section of tire armor in place; Fig. 2 is a broken sectional view on a reduced scale of a protector detached from a tire; Fig. 3 is a cross-sectional view of a protector detached.

Novel features herein disclosed but not claimed are claimed in co-pending divisional applications.

Referring to the drawing, 1 indicates one of the spokes of a wheel to which is secured a rim 2 having on one side an outwardly extending flange 3 and on the other side a shoulder $3^a$, the flange 3 forming a groove $3^x$, the purpose of which is to receive a retaining ring, not here shown as not being part of the present invention, and the shoulder $3^a$ together with the retaining ring securing the tire to the rim. Around said rim are arranged the two sections 4 of a hollow sheet metal ring. The hollow sections 4 have inner ends 7 abutting against each other, and broad outer ends 8 which extend, in general direction, in planes transverse to the axis of the wheel, and each section has an inner cylindrical side 5 contacting with the cylindrical surface of the rim, and an outer side 6, which is concave in cross-section, so that the sides 6 of the two sections of the metal ring have a substantially semi-circular form in cross-section.

Said ring sections 4 are secured together by long bolts 9, the heads 10 of which are received in a groove 11 in the outer wide end 8 of one ring section 4, while nuts 13 are screwed upon the other ends of said bolts and are received in a corresponding groove 14 in the wide end 8 of the other ring section 4.

Surrounding the hollow ring sections 4 and received in the concave outer sides 6 thereof is an endless pneumatic tube 16 of canvas, inflated in the usual manner, having a thin inner facing 17 of soft rubber and secured to a thick outer coating 18 of a portion thereof, also of soft rubber, which varies greatly in thickness. The coating 18 does not extend completely around the tube 16 and it is not interposed between the tube 16 and the hollow ring sections 4, but it begins on each side of the tube 16 where the sides of said tube leave the ring sections 4 and fits in the space between the sides of the tube 16 and the side portions of a tread or casing 19.

Said casing 19 is secured to the ring sections 4 in the following manner: Each ring section is formed in its wide side with a circular groove 21, and the edges of the casing are formed with beads 22 of metal or other rigid material, which enter said grooves. They are retained therein by means of rings 23, which are secured to the wide ends 8 of the ring sections 4 by screws 24, and which have inwardly extending portions 26 fitting tightly in said grooves 21 and wedging the beads therein and outward extensions 27, which overlap the inner edges of the casing and retain its inner edges in the grooves 21. The casing is formed with a tread 28 having, embedded in rubber, layers of canvas 29, and similar in general character to those at present in use.

Between the tread and the pneumatic tube is interposed a protecting ring 31. This ring comprises, in order proceeding from the outside inward, first, an outer ring 32 of soft rubber, then a circular series of rectangular protecting blocks 33 (with edges rounded off and their longer measurement being cross-wise of the tire), these blocks being of wood or other impenetrable material, spaced slightly from each other, then an inner ring 34 of soft rubber, then another series of blocks 36 of impenetrable material spaced slightly from each other, and then an inner ring or covering 35 of soft rubber. Said rings 32, 34, 35, are all connected with each other at the edges, so that the blocks 33 and 36 are completely inclosed, and said rings and blocks are all cemented together by rubber. The blocks of each series are staggered relatively to those of the other series, so that the spaces between the blocks of each series register with the central portions of the blocks of the other series. It will thus be seen that it is impossible for a nail or other sharp instrument to penetrate through both series of blocks. The blocks of the inner series are preferably convex so as to be thickest toward the center of their longer measurement, but also slightly concave at the centers of their inner surfaces as shown at 37, and all the blocks, both at their ends and at their edges where they are spaced from each other, are rounded so as to avoid any cutting of the rubber in contact therewith. The rubber intervening between the inner tube 16 and the casing 19, or between the inner tubes and the blocks 36, varies greatly in thickness, being thinnest next to the middle portions of the sides of the tube 16 and thickest next the ends of the blocks 36.

It will be seen that my improved tire is not subject to punctures such as are common with ordinary pneumatic tires, and that the only part exposed to wear is the tread, which can be renewed at a comparatively low cost when worn out.

The blocks 36 of the inner series have fluted portions, the purpose of which is to take up slack in the periphery of the inner tube 16 which exists when said tube is not fully inflated so as to assume a circular form; the convex shape of the inner series of blocks is to provide greater and quicker resiliency when pressed against said tube 16. When the tube is fully inflated it will assume a substantially circular form in cross-section, as shown in dotted lines.

It will be seen that my invention differs from prior constructions in that the pneumatic tube is inexpansible as distinguished from the soft rubber tubes heretofore used for pneumatic tubes. When inflated it assumes a form as nearly as possible circular in cross-section which, by thereby increasing the area within the tube, takes up all the slack in the cavity left between the flexible shield and the rim.

It will be observed that my invention differs from ordinary pneumatic tires in that there is interposed, between the inner tube and the tread of the tire, material that is, for the most part, inelastic, as contrasted with the large amount of rubber used on the outside or inside of the tire in some present day constructions. The contraction and expansion of this rubber in these old constructions, relieves, to a certain extent, the inflated inner tube of its work in contracting and expanding, but with a greater loss of energy, on account of the fact that air can contract and expand much more readily and with much less loss of energy than solid elastic material. Consequently, it is an advantage that no attempt should be made to take up the shocks, caused by the running on the road-bed, by means of rubber, but that the whole of the work should be thrown upon the elastic air within the inner tube, and this I accomplish in my invention by interposing as much as possible only inelastic material between the inner tube and the outside of the tire, the intervening portions of rubber only being of sufficient thickness to form a container for the different pieces of impenetrable material to hold the same in their proper relations and to render the shield flexible in a circumferential direction, thus constituting a single, flexible, continuous, annular belt.

Another purpose of my invention is to provide a tire that will not require an outer casing with stiff heavy sides as those of the casings in present use or with sides extending inwardly so that they in themselves form the circle inclosing the inner tube, or with the heavy clencher or heavy bead construction, but which will instead permit of and have an outer casing or shoe constructed with relatively thin flexible sides, which need extend only a short distance beyond the center of the circumference of the inner tube, and are there removably fastened to the metal tire section, thus providing a highly flexible and inexpensive and easily replaceable wearing shoe.

I claim:—

1. In a resilient tire, in combination, a pneumatic tube, a casing or shoe around the tube having a tread portion, and, interposed between the tread portion and the pneumatic tube, an annular flexible shield comprising inner and outer series of impenetrable devices with rounded edges arranged side by side in each series with their longer dimension in the transverse direction of the shield and tire, the inner series being convex on both their inner and outer surfaces so that they are thicker toward their center, and the devices of the outer series being concave on their inner surfaces, and convex on their outer surfaces, the devices of the two series being in staggered relation to each other, and material surrounding each device and each series of devices, said material and devices and series being cemented to each other so as to maintain said devices and series in their proper relation to each other and to form a single flexible continuous annular belt.

2. In a resilient tire, in combination, a pneumatic tube, a casing or shoe around the tube, having a tread portion and sides extending inwardly and slightly beyond the middle of the sides of the pneumatic tube, and, interposed between the tread portion and the pneumatic tube, an annular flexible shield, comprising inner and outer series of non-metallic impenetrable devices with rounded edges arranged side by side in each series with their longer dimensions in the transverse direction of the shield and tire, and the devices of the inner series being convex on both their inner and outer surfaces so that they are thicker toward their center, except that at, and on both sides of, the center of the inner surfaces the same are concave and fluted transversely of the ring and tire, and the devices of the outer series being concave on their inner surfaces and convex on their outer surfaces, the devices of the two series being in staggered relation to each other, the spaces between the devices of each series registering with the middle portions of the devices of the other series, and rubber surrounding each device and each series of devices, said rubber and devices and series being cemented and vulcanized to each other so as to maintain said devices and series in their proper relation to each other and to form a single flexible continuous annular belt.

JOHN B. ZIMDARS.

Copies of this patent may be obtained for five cents each, by addressing the "Commissioner of Patents, Washington, D. C."